(12) United States Patent
Townsend

(10) Patent No.: US 11,209,119 B2
(45) Date of Patent: Dec. 28, 2021

(54) DISPLAY STAND FOR TABLETS

(71) Applicant: FREEFORM DESIGN, INC., Fort Worth, TX (US)

(72) Inventor: Matthew W Townsend, Fort Worth, TX (US)

( * ) Notice: Subject to any disclaimer, the term of this patent is extended or adjusted under 35 U.S.C. 154(b) by 0 days.

(21) Appl. No.: 16/903,131

(22) Filed: Jun. 16, 2020

(65) Prior Publication Data

US 2020/0393079 A1    Dec. 17, 2020

Related U.S. Application Data

(60) Provisional application No. 62/862,198, filed on Jun. 17, 2019.

(51) Int. Cl.
| | |
|---|---|
| *G06K 7/00* | (2006.01) |
| *F16M 11/20* | (2006.01) |
| *A47F 9/04* | (2006.01) |
| *G06K 7/10* | (2006.01) |
| *G06Q 20/20* | (2012.01) |

(52) U.S. Cl.
CPC ......... *F16M 11/2021* (2013.01); *A47F 9/046* (2013.01); *G06K 7/0013* (2013.01); *G06K 7/10366* (2013.01); *A47F 2009/041* (2013.01); *F16M 2200/021* (2013.01); *G06Q 20/20* (2013.01)

(58) Field of Classification Search
CPC ... F16M 11/2021; A47F 9/046; G06K 7/0013; G06K 7/10366
USPC ........................................................ 235/440
See application file for complete search history.

(56) References Cited

U.S. PATENT DOCUMENTS

| | | | | |
|---|---|---|---|---|
| D724,598 S | * | 3/2015 | Gelsomini | .................... D14/447 |
| D750,089 S | * | 2/2016 | Langhein | ................ A45C 11/00 |
| | | | | D14/447 |
| 2011/0315733 A1 | * | 12/2011 | White | ..................... B60R 11/02 |
| | | | | 224/600 |
| 2012/0175396 A1 | * | 7/2012 | Patino | .................... A45C 11/00 |
| | | | | 224/627 |
| 2012/0187257 A1 | * | 7/2012 | Zou | ........................ F16M 11/40 |
| | | | | 248/125.8 |
| 2013/0181101 A1 | * | 7/2013 | Avganim | ............ E05B 73/0082 |
| | | | | 248/205.1 |
| 2013/0278122 A1 | * | 10/2013 | Edwards | ............... E05B 65/461 |
| | | | | 312/237 |
| 2014/0265752 A1 | * | 9/2014 | Caine | ................... A47C 21/003 |
| | | | | 312/7.2 |
| 2015/0293344 A1 | * | 10/2015 | Schainholz | .......... G06F 1/1628 |
| | | | | 359/822 |

(Continued)

*Primary Examiner* — Daniel A Hess
(74) *Attorney, Agent, or Firm* — Sheri Higgins; Sheri Higgins Law, PLLC

(57) ABSTRACT

A stand for housing a tablet can include: a front plate; a bottom plate; and a first and a second tablet support bracket, wherein the front plate has an opening for displaying a screen of the tablet, wherein the front plate is rotatably connected to the bottom plate via a hinge, and wherein the first and the second tablet support bracket secure the tablet within the stand. The hinge can be a continuous torque hinge. The first and second tablet support brackets can include a flange that supports placement of a tablet into the stand. The stand can be rotated to allow better visibility of the tablet screen. The stand can also include a swivel for turning the tablet for better visibility.

19 Claims, 5 Drawing Sheets

(56) References Cited

U.S. PATENT DOCUMENTS

2016/0033997 A1* 2/2016 Heckler ................ G06F 1/1633
                                                                                         361/679.56
2018/0080597 A1* 3/2018 Weldon ................. G06F 1/1632

\* cited by examiner

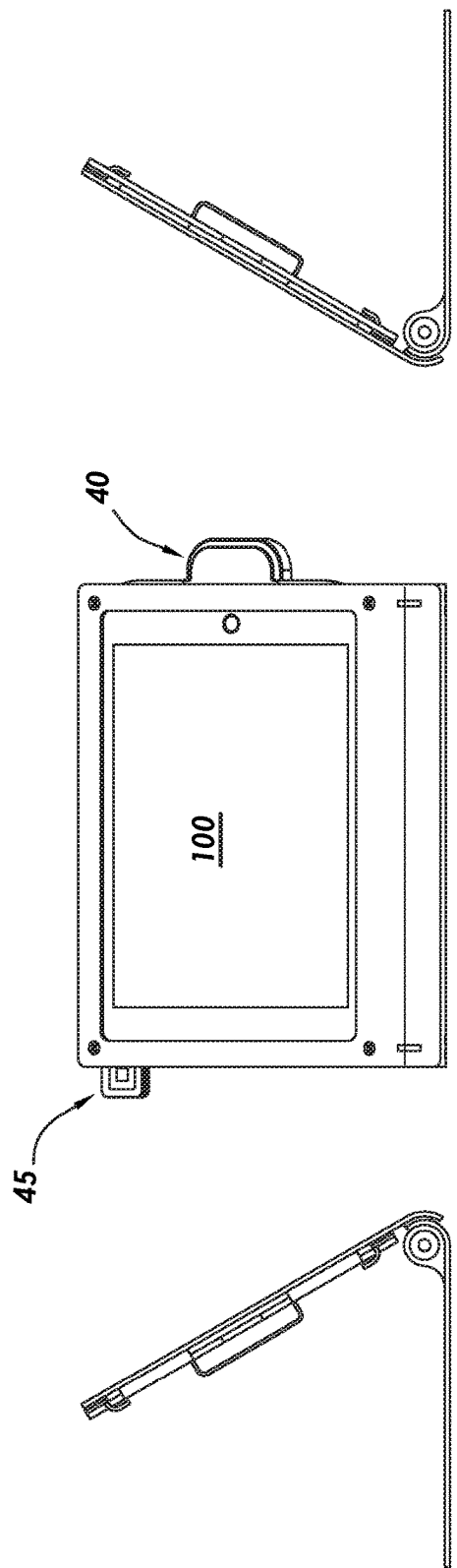
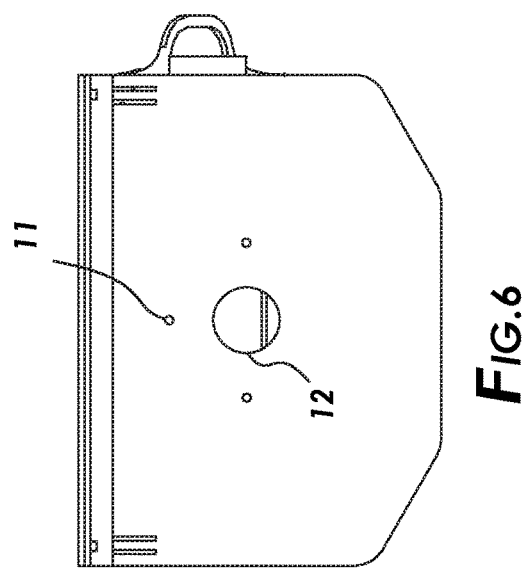

DISPLAY STAND FOR TABLETS

TECHNICAL FIELD

A display stand for tablets can be used to display a tablet for point-of-sale systems, brand awareness, informational displays, table-side ordering, etc. The stand can house the tablet for easier use by a company and purchaser.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIGS. 3 and 5 are side views of the stand according to certain embodiments.

FIG. 4 is a front view of the stand with a tablet housed within the stand according to certain embodiments.

FIG. 6 is a bottom view of the stand according to certain embodiments.

DETAILED DESCRIPTION

Figure 1:
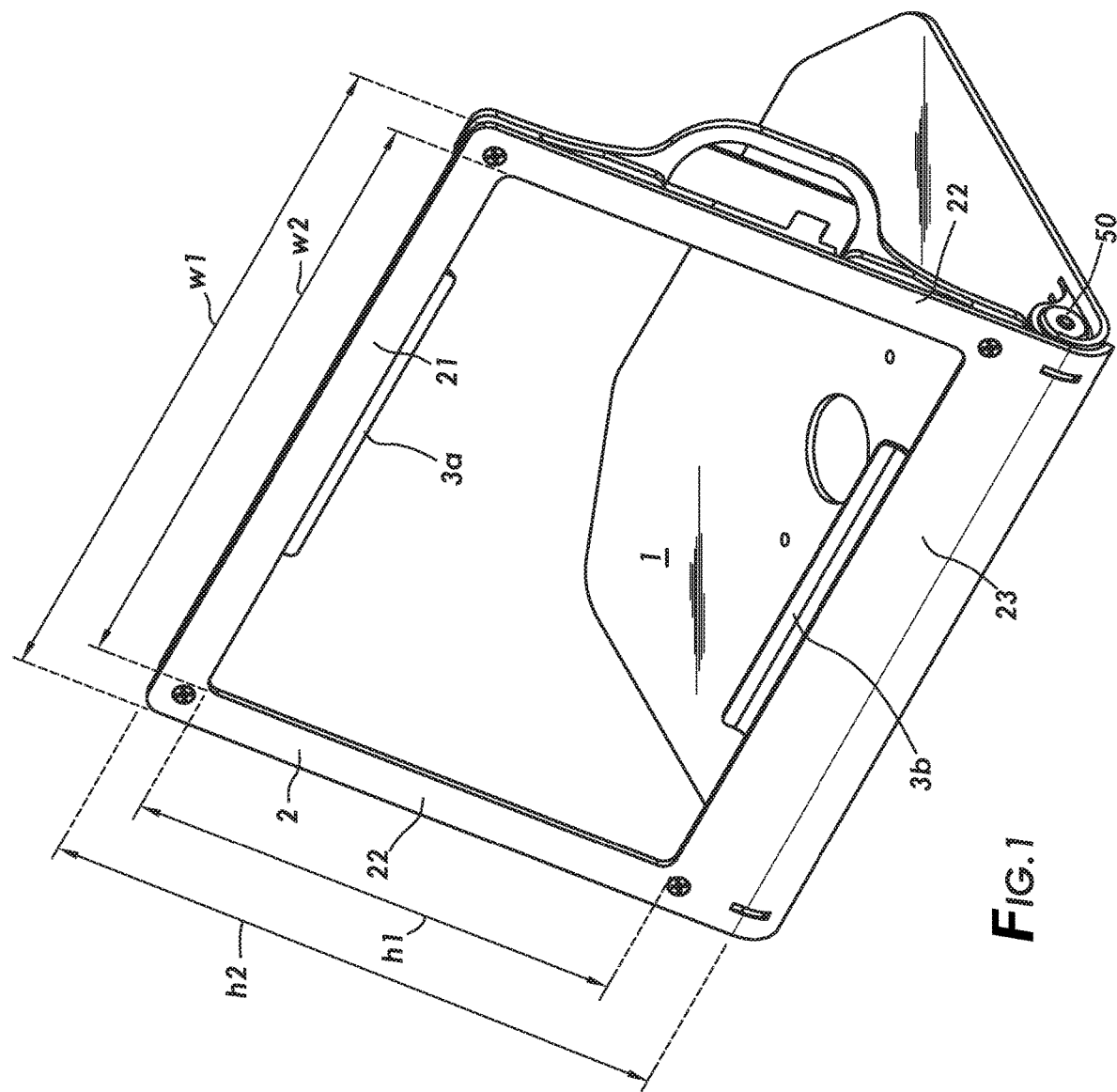
FIG. 1 is a perspective view of the display stand according to certain embodiments.

Use of tablet systems for retailers to allow a purchaser to conduct transactions is becoming more widespread. The system is known in the industry as a point-of-sale (POS) system. The tablet stand allows a seller and/or purchaser to see various items for sale, use a touchscreen of the tablet to select items, and can also include a credit card reader and/or square reader whereby the purchaser can pay for the items. The POS system can also allow a purchaser to add gratuity and electronically sign the credit card purchase via the touchscreen on the tablet. The tablet generally includes downloadable software that provides the various features just described. The tablet stand can also be used, for example, in museums or other places to display information. By way of yet another example, the tablet stand can also be used for table-side ordering at restaurants.

It is common for the tablet of the POS system to be housed in a stand. Tablets are generally rectangular in shape and can be a variety of different sizes. For example, mini tablets can have a screen size of approximately 5 to 8 inches (in.), while other tablets can range from about 10 in. to about 13 in. The screen size can indicate the overall outer dimensions for the tablet. Screen sizes are stated for the diagonal distance of the actual screen (e.g., from a top left corner to a bottom right corner). By way of example, a tablet with a 10.2 in. screen can have outer dimensions of 10 in. height and a 7 in. width. The depth or thickness of the tablet can also vary—commonly ranging from 0.2 to 0.8 in. The stand can be configured to provide a way to house the tablet.

In some instances where movement of the stand is not necessary, the stand can be mounted to a counter. This may be useful when there is a checkout counter whereby customers pay for items at the checkout counter. In other instances, such as table-side ordering, the stand may not be mounted to a counter.

Current stands for tablets may not be attractive in appearance and can be quite difficult to position a tablet within the stand. For example, some tablet stands require multiple screws to be removed in order to place the tablet within the stand and the screws re-inserted in order to secure the tablet within the stand. Other systems may utilize a system designed to slide the tablet into the stand; however, there are disadvantages to these systems as the tablet may not be securely housed within the stand. Thus, there is a need and ongoing industry wide concern for tablet stands that are attractive and easy to operate.

A display stand for a tablet is provided. The display stand has an improved securing mechanism to removably house a tablet. The display stand also has a hinge assembly that allows a front plate to rotate relative to a bottom plate. This novel rotation allows a person to adjust the front plate and the tablet so that better viewing can occur. For example, depending on a person's height, the front plate and tablet can be rotated farther away from or closer to the bottom plate in order to see information displayed on the tablet more easily.

A stand for housing a tablet can include: a front plate; a bottom plate; and a first and a second tablet support bracket, wherein the front plate has an opening for displaying a screen of the tablet, wherein the front plate is rotatably connected to the bottom plate, and wherein the first and the second tablet support bracket secure the tablet within the stand.

Turning to the figures, FIG. 1 is a perspective view of a stand for housing a tablet. As shown in FIG. 1, the stand can include a front plate 2, a bottom plate 1, and a first and second tablet support brackets 3a and 3b.

The front plate 2 includes an opening. The opening allows a screen of a tablet 100 (not shown in FIG. 1) to be viewed from a front side of the stand. According to any of the embodiments, the front plate 2 can be constructed as a single piece of material and includes in inner perimeter and an outer perimeter. The inner perimeter defines the opening of the front plate 2. As can be seen in FIG. 1, the distance between the inner perimeter and the outer perimeter can be different for a top portion 21, side portions 22, or bottom portion 23 of the front plate 2. As used herein, the "bottom portion" is the area located closest to a hinge 50, the "top portion" is the area located opposite of the bottom portion, and the side portions are parallel to one another and perpendicular to both the top and bottom portions. By way of example, as shown in FIG. 1, the distance between the inner perimeter and the outer perimeter of the bottom portion can be greater than the front portion and/or side portions. According to certain other embodiments, the distance between the inner perimeter and the outer perimeter of any of the portions can be substantially the same. The corners of the top portion 21 can also be rounded, for example, as shown in FIG. 1.

The perimeters of the front plate 2 can generally be rectangular in shape or any other shape to match the shape of the screen of a tablet. In some embodiments, the tablet can be rotated 90° (or turned on its side) to be horizontally positioned within the stand. Accordingly, the height of the tablet would correspond to the width of the stand, and the width of the tablet would correspond to height of the stand. According to other embodiments, the tablet can be positioned vertically within the stand. For a horizontally positioned tablet, the front plate 2 can have an outer perimeter width w1 in the range of 7 to 20 in. and an outer perimeter height h1 in the range of 2 to 15 in. The front plate 2 can have an inner perimeter width w2 in the range of 6 to 19 in. and an inner perimeter height h2 in the range of 1.5 to 14.5 in. For a vertically positioned tablet, the front plate 2 can have an outer perimeter width w1 in the range of 2 to 15 in. and an outer perimeter height h1 in the range of 7 to 20 in. The front plate 2 can have an inner perimeter width w2 in the range of 1.5 to 14.5 in. width and an inner perimeter height h2 in the range of 6 to 19 in. According to certain embodiments, the inner perimeter of the front plate 2 defines an opening that is 0% to −10% of the dimensions of the screen of the tablet. By way of example, the inner perimeter of the front plate 2 can have the same dimensions as the screen of the tablet. By way of another example, the inner perimeter of the front plate can be smaller (i.e., have an opening that is up to negative 10%) than the size of the screen. According to this example, the inner perimeter of the front plate can partially cover the screen of the tablet.

Figure 2:
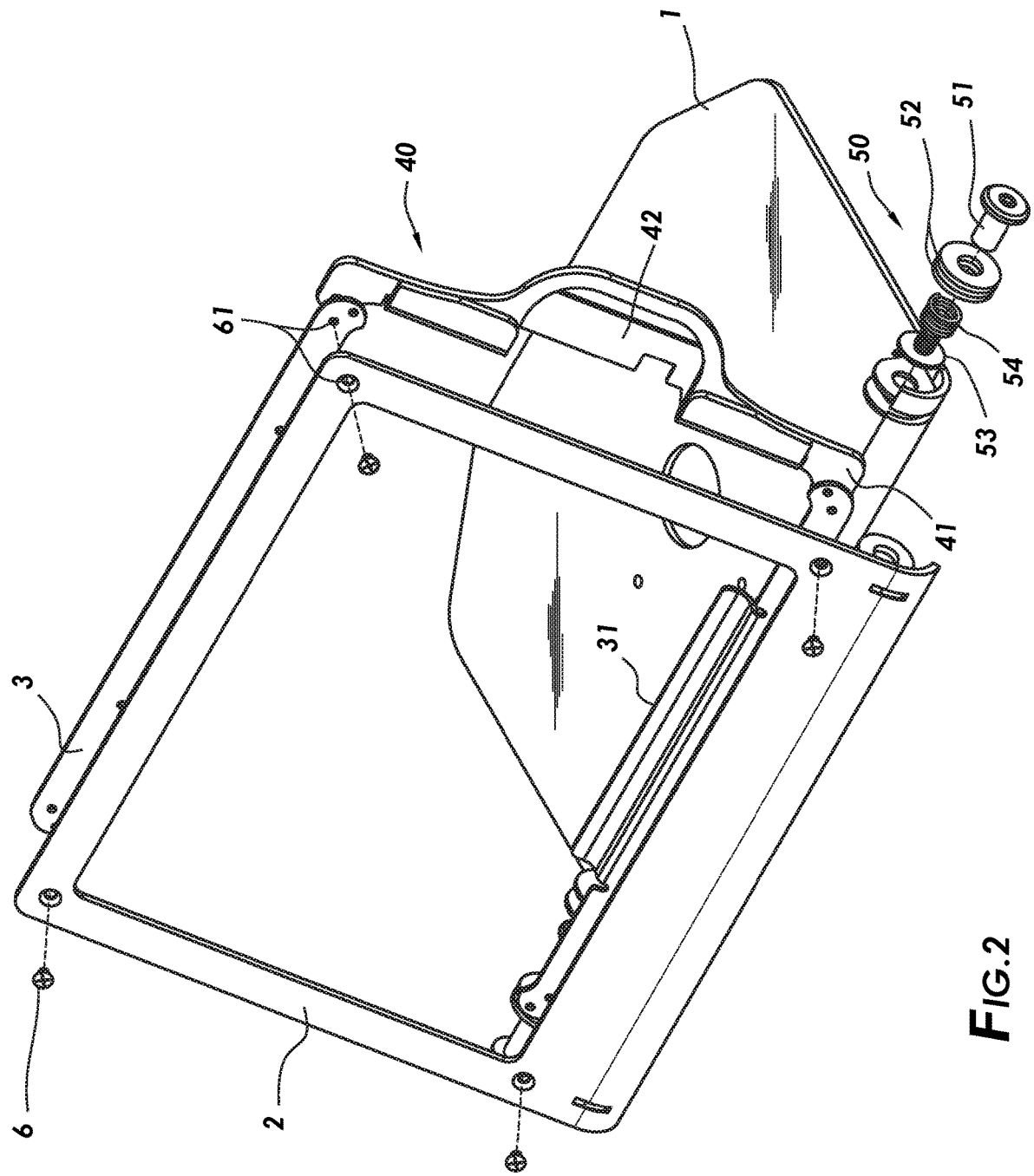
FIG. 2 is a perspective view of the display stand of FIG. 1 showing the relationship of the various parts and a hinge assembly according to certain embodiments.
Figure 7:
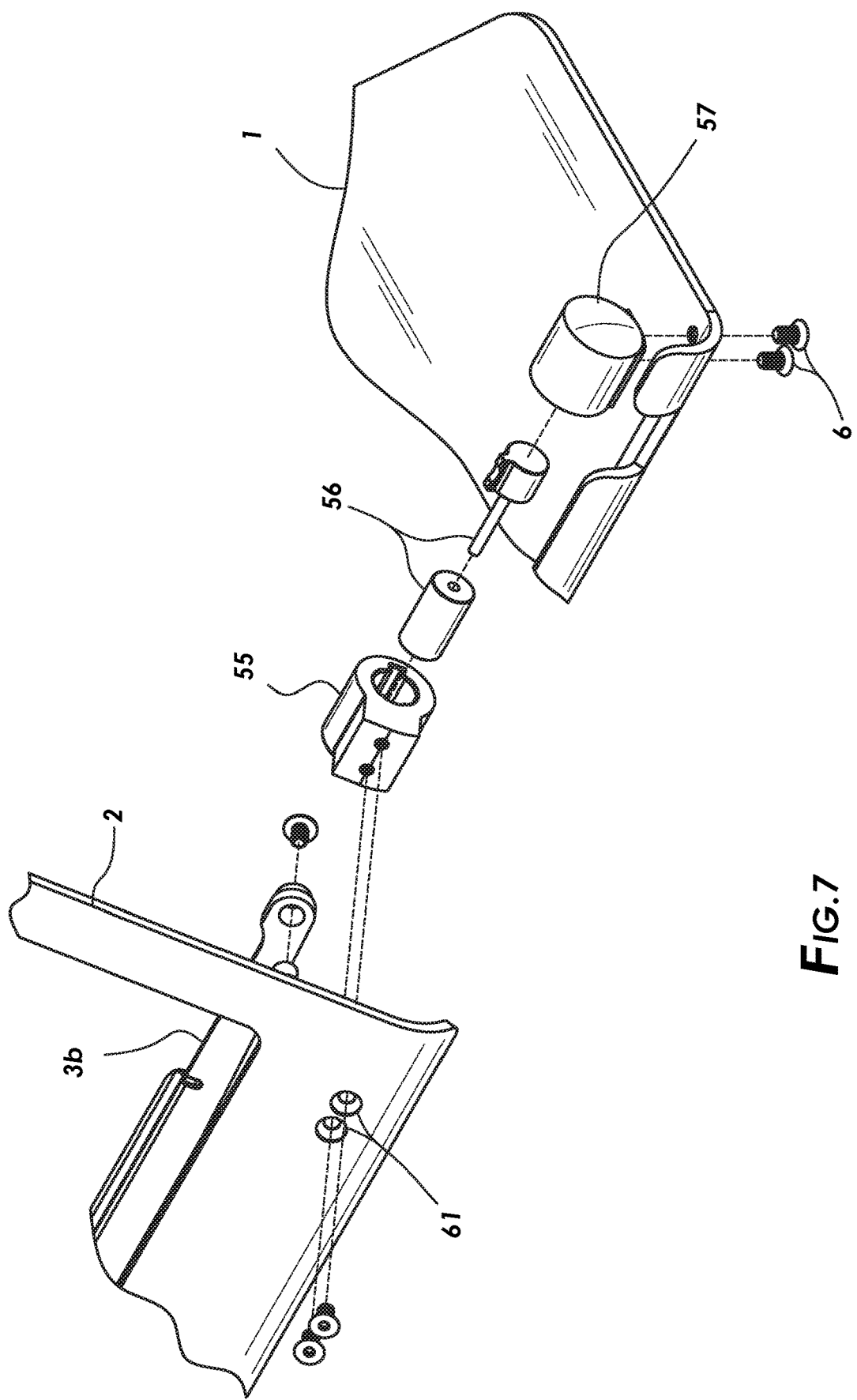
FIG. 7 is a perspective view of the tablet with a hinge assembly according to certain other embodiments.

The front plate 2 can be in rotational connection to the bottom plate 1 via a hinge 50. The front plate 2 can be permanently connected to the bottom plate 1 via the hinge 50. The hinge can be a continuous torque hinge. The stand can include two or more hinges 50. For example, a first hinge can be located at a first edge of the bottom plate and a second hinge located opposite of the first hinge at a second edge of the bottom plate. A third, fourth, etc. hinge can be placed at a desired location between the first and second hinges in order to support heavier tablets or unique applications. By way of one, non-limiting example and as shown in FIG. 2, the hinge 50 can include a joint nut 51, one or more friction washers 52, a hinge screw 53, and a spring 54. A hinge 50 according to certain other embodiments is shown in FIG. 7 and discussed below. A plane of the front plate 2 can be rotated relative to a plane of the bottom plate 1 in a range of between 0° and 180°. A 180° rotation would result in the front plate forming a flat plane with the bottom plate; whereas a 0° rotation would result in the front plate being folded to lay substantially on top of the bottom plate. A 90° rotation would result in a plane of the front plate being perpendicular to a plane of the bottom plate. As discussed above, the ability to rotate the front plate 2 relative to the bottom plate 1 allows a person to adjust the front plate for better viewing of the screen of the tablet. A taller person may need to utilize a smaller angle (e.g., less than 45°) in order to obtain good visibility. The hinge can optionally include one or more hard stops that prevent the front plate 2 from being rotated beyond a predetermined angle. By way of a non-limiting example, the hinge can include a hard stop at 0° and 90°.

The stand also includes the first and second tablet support brackets 3. The first and second tablet support brackets 3 can be removably attached to a back side of the front plate 2 via a fastener. As shown in FIG. 2, the fastener can include screws 6 that are positioned through a hole 61 on the front plate 2 and then through a corresponding hole 61 on the tablet support brackets 3. The holes in the first and second tablet support brackets 3 can optionally include threads for securing the screws 6 such that the first and second tablet support brackets 3 become attached to the front plate 2. A nut, not shown, can optionally be included to attach the first and second tablet support brackets 3 to the front plate 2. By way of yet another example, the front plate 2 can include a self-clinching thread system, such as that sold by PEM® embedded within the holes. According to this embodiment, screws 6 would be inserted into the holes of the front plate 2 containing the self-clinching system from a back side (i.e., the side farthest away from the front plate 2) of the first and second tablet support brackets 3. If a self-clinching thread system is utilized, the self-clinching thread system can be installed on a back side of the front plate, the tablet support brackets would then align using the body of the self-clinching thread system nut, and secured to the back side of the front plate 2 with a screw. In this manner, a front side of the front plate 2 would not have visible holes or screws.

As shown in FIG. 2, each of the first tablet support bracket 31a and the second tablet support bracket 31b comprise a hole 61 located near both ends of the support bracket. The top portion 21 of the front plate 2 also includes two holes 61 located near the corners. The bottom portion 23 of the front plate 2 also includes two holes 61 located near the corners of the inner perimeter. In this manner, the holes in the first and second tablet support brackets 3 and the front plate 2 can be aligned and the screws 6 inserted into the aligned holes.

According to certain other embodiments, the first and second tablet support brackets 3 can be removably secured to the front plate 2 via a plurality of clips (not shown). The clips can be U-shaped and placed over the outside of the first and second tablet support brackets 3 and the front plate 2 when aligned.

The first and second tablet support brackets 3 can have dimensions selected such that the first and second tablet support brackets 3 are hidden from view when looking from a front direction onto the front plate 2. By way of example, the length of the first and second tablet support brackets 3 can be less than or equal to the length of the top portion 21 and bottom portion 23 of the front plate 2. The height of the first and second tablet support brackets 3 can be less than or equal to the height of the top portion 21 and bottom portion 23 of the front plate 2. According to the embodiments in which the height of the bottom portion 23 is greater than the height of the top portion 21 (for example, to accommodate the hinges 50), the height of the second tablet support bracket 31b can be the same height as the first tablet support bracket 31a. According to these embodiments, the second tablet support bracket 31b can be located closer to the inner perimeter of the front plate 2. The first and second tablet support brackets 3 can have a length ranging from 6 to 20 in. and a height ranging from 0.25 to 4 in. The first and second tablet support brackets 3 can be created as a single part which would cradle the tablet in a single molded or formed support piece.

The first and second tablet support brackets 3 can include rounded corners to provide stability to the tablet and eliminate lateral movement of the tablet when the tablet is secured within the stand. Each of the first and second tablet support brackets 3 further include a flange 31 located near a middle of the tablet support brackets. As shown in FIG. 2, the flanges 31 can have a width that spans a portion of the length of the first and second tablet support brackets 3. The flanges 31 can also have a width that spans substantially the entire length of the first and second tablet support brackets 3. According to this embodiment, it is preferred that the width of the flanges 31 are less than a width that would obstruct placement of screws 6 into holes 61. The width of the flanges 31 can be in the range of 2 in. to 18 in. The flanges 31 are preferably permanently secured, for example, via welding or spot welding, to the first and second tablet support brackets 3. The flanges 31 can alternatively be part of a single-piece construction of the first and second tablet support brackets 3.

The first and second tablet support brackets 3 have a length and width that defines a front and back plane of the brackets. The "front plane" is the surface of the brackets that would be located closest to a back side of the front plate 2 and the "back plane" is the surface of the brackets that would be located farther away from the back side of the front plate 2 in an assembled state. The flanges 31 can be generally L-shaped with a portion extending substantially perpendicularly away from the front plane of the first and second tablet support brackets 3 and a portion extending upwards into the opening of the front plate 2 substantially parallel to the front plane of the first and second tablet support brackets 3. The substantially perpendicular portion can have dimensions such that the tablet can be placed within the flange 31. By way of example, if the tablet has a thickness of 0.4 in., then the substantially perpendicular portion can have dimensions greater than 0.4 in. in order to accommodate the tablet. According to any of the embodiments, the dimensions of the perpendicular portion are within +5% to 15% of the thickness of the tablet. The substantially parallel portion can be selected such that the flange 31 makes contact with the back of the tablet to prevent the tablet from falling out of the stand. The substantially parallel portion can have a height in the range from 0.5 in. to 4 in.

In practice and according to certain embodiments, the tablet is inserted into the stand by first removing the screws that attach the first tablet support bracket 3a to the front plate 2, then positioning the tablet into the second tablet support bracket 3b, aligning the upper tablet support bracket holes 61 with the holes 61 on the front plate 2, and finally inserting the screws 6 through the holes to attach the upper tablet support bracket to the front plate 2. According to certain other embodiments, the tablet is inserted into the stand by first removing the screw that attaches a side (e.g., the left side) of the first tablet support bracket 3a to the front plate 2, then rotating the first tablet support bracket 3a upwards via a hinge pin located within the holes of the side of the first tablet support bracket 3a and the corresponding hole of the front plate 2, then positioning the tablet into the second tablet support bracket 3b, aligning the upper tablet support bracket holes 61 of the opposite side with the holes 61 on the front plate 2 by rotating the first tablet support bracket 3a downwards, and finally inserting the screw 6 through the holes to attach the upper tablet support bracket to the front plate 2.

According the certain other embodiments, the ends of the first and second tablet support brackets 3 can include a clip or flexible material. The ends can be rotated via the clips or flexible material to allow the tablet to be slid into the stand from either side, the top, or the back of the stand.

The stand can optionally further include a card (e.g., a debit or credit card) reader 40. The card reader 40 can include a card reader base 41 and a support hat 42. The support hat 42 is generally used to guide the card as the card is being swiped. The card reader 40 can also include a slot for receiving a card with a chip. The card reader 40 can also be designed to process a contactless card. A contactless card is simply held in proximity to the reader without needing to swipe or insert the card for processing.

As can be seen in FIG. 2, the first and second tablet support brackets 3 can further include a second set of holes 61 located near the holes for connecting the first and second tablet support brackets 3 to the front plate 2. The card reader 40 can include holes located near the ends that correspond to the second set of holes on the first and second tablet support brackets 3 to allow the card reader 40 to be removably attached onto the first and second tablet support brackets 3 from a back side via any of the attachments discussed above regarding the tablet support brackets 3. The card reader 40 can be removably attached to the first and second tablet support brackets 3 on either the left or right side of the front plate 2 (shown in FIG. 2 as being positioned on the right side of the front plate).

The stand can further include an additional accessory input device 45. The additional accessory input device 45 can be, for example, a secondary card reader or a scanner. The additional accessory input device 45 can be connected to a headphone jack or similar data port on the tablet. Square is a brand name of such a secondary card reader. The additional accessory input device 45 can also be used to process a card for purchases. The additional accessory input device 45 can be used in addition to the card reader 40 or instead of the card reader 40. If the additional accessory input device 45 is used in addition to the card reader 40, then the additional accessory input device 45 can be removably attached to the left or right side of the front plate 2 that is opposite from the location of the card reader 40.

The stand can optionally include a back plate, not shown. The back plate can be removably attached behind the first and second tablet support brackets 3 and the tablet.

FIG. 3 is a left, side view and FIG. 5 is a right, side view of the stand. FIG. 4 is a front view of the stand with a tablet 100 positioned within the stand.

The stand also includes a bottom plate 1. The bottom plate 1 is rotatably connected to the front plate 2 via hinges 50. The bottom plate 1 can have a width that is substantially the same as the outer perimeter width w1 of the front plate 2. The bottom plate 1 can have a length that is greater than, equal to, or less than its width. According to certain embodiments, the bottom plate 1 has a length such that the tablet stand is stable when located on a fixture, such as a countertop—especially during rotation and use. Accordingly, depending on the width of the bottom plate 1, the length may need to be greater than its width in order to provide stability to the stand. As shown in FIG. 6, the bottom plate 1 can further include anchoring holes 11. There can be 2 or more anchoring holes 11 on the bottom plate. The anchoring holes 11 can receive a screw or other fastener, such as a nail, in order to semi-permanently affix the bottom plate 1 to the fixture. If anchoring holes 11 are included, then the length of the bottom plate 1 may be less than or equal to the width because stability will be provided by the fastener.

The bottom plate 1 can be square or rectangular in shape. As shown in the figures, the bottom plate 1 can have angled back edges in order to provide a more aesthetic design. The bottom plate 1 can optionally include a logo/branding area. The bottom plate 1 can also optionally include a hole 12 in which one or more cables (e.g., power supply cables, internet cables, etc.) can be fed through the hole 12. The bottom plate 1 can also include a swivel (not shown) that is mounted on an underneath side of the bottom plate 1. The swivel can also be mounted to a top side of a surface. The swivel can allow the stand to be swiveled 180° to 360°. By way of example, a cashier may input an item for purchase on the tablet and then turn the stand 1800 via the swivel so that a customer can view the tablet screen and complete the purchase.

FIG. 7 is a partial perspective view of the stand with a hinge 50 according to other embodiments. As can be seen in FIG. 7, the hinge 50 can include a front plate hinge receiver 55, a continuous torque hinge 56 that can include two or more separate parts, and a bottom plate hinge receiver 57. The parts of the continuous torque hinge 56 can matingly engage one another. The continuous torque hinge 56 can fit inside the front plate hinge receiver 55 and the bottom plate hinge receiver 57. Each of the front plate 2 and the front plate hinge receiver 55 can include one or more holes 61 for securing the front plate hinge receiver 55 to the front plate 2 via screws 6. Each of the bottom plate 1 and the bottom plate hinge receiver 57 can include one or more holes 61 for securing the bottom plate hinge receiver 57 to the bottom plate 1 via screws 6. A portion of both the front plate hinge receiver 55 and bottom plate hinge receiver 57 can be substantially flat instead of round to provide a flush surface for connecting to the back of the front plate 2 and top of the bottom plate 1. The holes 61 can include threads or other features as discussed above.

Figure 8:
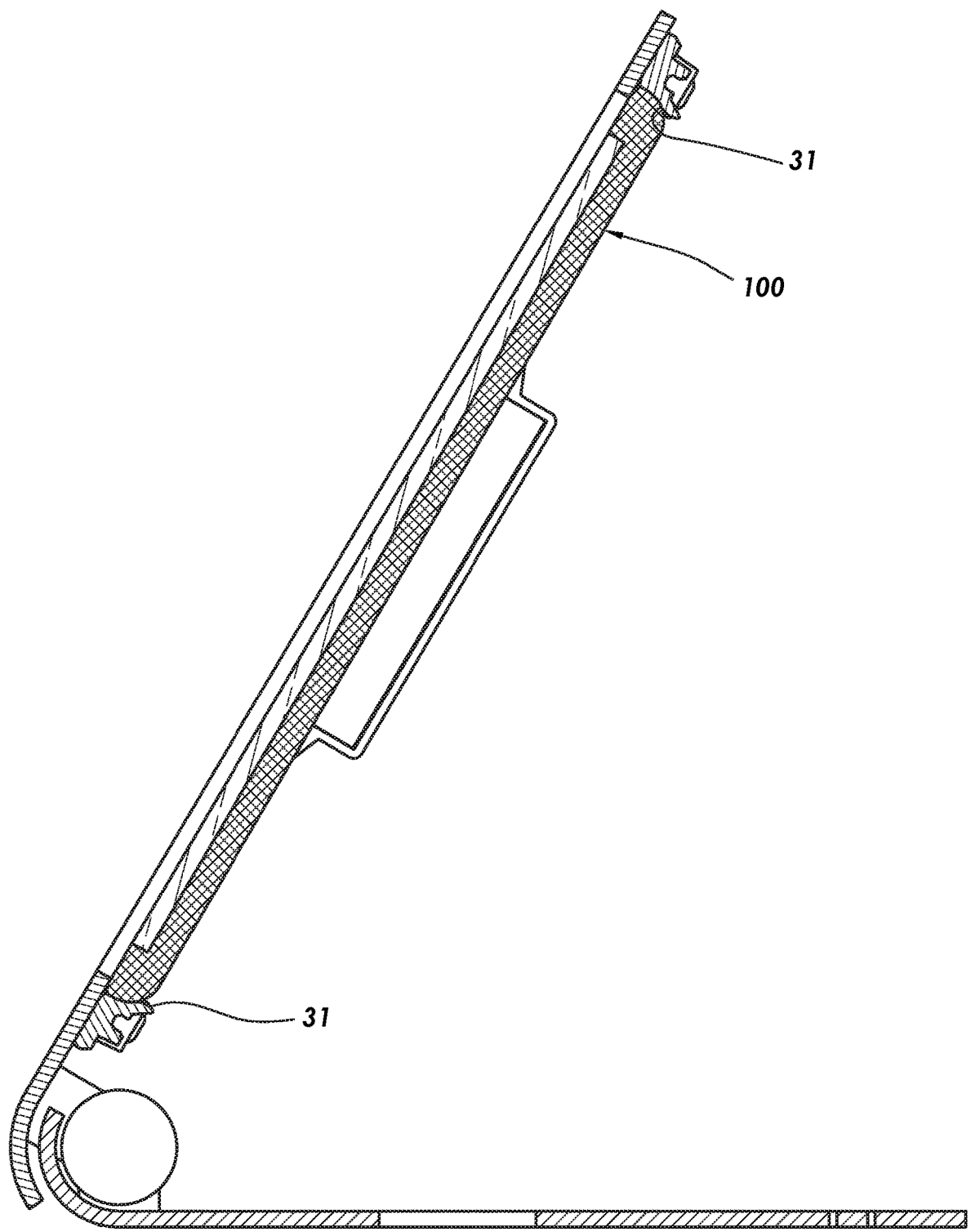
FIG. 8 is a cross-sectional side view of a tablet support bracket flange according to certain embodiments.

FIG. 8 is a side view showing a flange 31 on the first and second tablet support brackets 3 according to certain other embodiments. The flange 31 in FIG. 8 can be curved in shape instead of being generally L-shaped as shown in FIG. 2. A curved shape may be useful to retain the tablet 100 within the stand for tablets of varying thicknesses.

The bottom plate 1, front plate 2, and first and second tablet support brackets 3 can be made from a variety of materials. The material can be the same or different. Examples of suitable materials include metals, metal alloys, wood, and hardened plastics. Metals can include aluminum, copper, iron, and nickel. Metal alloys can include brass, bronze, pewter, cast and wrought iron, and steel. Examples of wood include pine, oak, cherry, hickory, walnut, and plywood. According to certain embodiments, the hinge 50 areas on the front plate 2 and the bottom plate 1 may need a laminate or treatment (e.g., sanding or polishing) to reduce or eliminate friction between the front and bottom plates during rotation of the front plate 2 relative to the bottom plate 1.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more brackets, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A stand for housing a tablet comprising:
a front plate, wherein the front plate comprises a first, second, third, and fourth edge,
and wherein the first edge and the third edge have a length that is greater than the second edge and the fourth edge;
a bottom plate; and
a first and a second tablet support bracket, wherein the first tablet support bracket is positioned adjacent to and spans a portion of the first edge, and wherein the second tablet support bracket is positioned adjacent to and spans a portion of the third edge, wherein the front plate has an opening for displaying a screen of the tablet, wherein the front plate comprises in inner perimeter and an outer perimeter, wherein the inner perimeter forms the opening for displaying the screen of the tablet, wherein the front plate is rotatably connected to the bottom plate via a hinge, and wherein the first and the second tablet support bracket secure the tablet within the stand.

2. The stand according to claim 1, wherein the tablet is positioned horizontally within the stand, and wherein the front plate has: an outer perimeter width in the range of 7 to 20 inches; an outer perimeter height in the range of 2 to 15 inches; an inner perimeter width in the range of 6 to 19 inches; and an inner perimeter height in the range of 1.5 to 14.5 inches.

3. The stand according to claim 1, wherein the tablet is positioned vertically within the stand, and wherein the front plate has: an outer perimeter width in the range of 2 to 15 inches; an outer perimeter height in the range of 7 to 20 inches; an inner perimeter width in the range of 1.5 to 14.5 inches; and an inner perimeter height in the range of 6 to 19 inches.

4. The stand according to claim 1, wherein the opening is 0% to −10% of the dimensions of the screen of the tablet.

5. The stand according to claim 1, wherein the hinge is a continuous torque hinge.

6. The stand according to claim 5, wherein the hinge comprises a joint nut, one or more friction washers, a hinge screw, and a spring.

7. The stand according to claim 5, wherein the hinge comprises a front plate hinge receiver, a continuous torque hinge, and a bottom plate hinge receiver, and wherein the continuous torque hinge is located inside of the front plate hinge receiver and the bottom plate hinge receiver.

8. The stand according to claim 5, wherein the hinge further comprises one or more hard stops that prevent the front plate from being rotated beyond a predetermined angle.

9. The stand according to claim 1, wherein a plane of the front plate is rotated relative to a plane of the bottom plate in a range of between 0° and 180°.

10. The stand according to claim 1, wherein the first and second tablet support brackets are removably attached to a back side of the front plate via a fastener.

11. The stand according to claim 10, wherein the fastener comprises two or more screws that are positioned through two or more holes on the front plate and through a corresponding hole on the first and second tablet support brackets.

12. The stand according to claim 10, wherein the fastener comprises a self-clinching thread system embedded within two or more holes on the front plate, and two or more screws that are inserted through a corresponding hole on the first and second tablet support brackets and into the two or more holes of the front plate from a back side of the stand.

13. The stand according to claim 10, wherein the fastener comprises a plurality of clips.

14. The stand according to claim 1, wherein the first and second tablet support brackets have a length ranging from 6 to 20 inches and a height ranging from 0.25 to 4 inches.

15. The stand according to claim 1, wherein each of the first and second tablet support brackets comprise a flange, wherein the tablet is supported within the stand via the flange, and wherein the flange has a width that spans a portion of the length of the first and second tablet support brackets.

16. The stand according to claim 1, wherein the flange is substantially L-shaped having a portion extending substantially perpendicularly away from a front plane of the first and second tablet support brackets and a portion extending upwards into the opening of the front plate substantially parallel to the front plane of the first and second tablet support brackets.

17. The stand according to claim 1, wherein the stand further comprises a card reader.

18. The stand according to claim 1, wherein the bottom plate further comprises one or more of:
- one or more anchoring holes, wherein the anchoring holes receive a fastener that semi-permanently affixes the bottom plate to a fixture;
- a cable hole, wherein the cable hole receives cables or power cords; and
- a swivel that is mounted on an underneath side of the bottom plate.

19. The stand according to claim 1, wherein the bottom plate, the front plate, and the first and second tablet support brackets are made from materials selected from the group consisting of metals, metal alloys, wood, hardened plastics, and combinations thereof.

* * * * *